US007067760B2

(12) United States Patent
Porta

(10) Patent No.: US 7,067,760 B2
(45) Date of Patent: Jun. 27, 2006

(54) WELDING GUN

(75) Inventor: Dino Porta, Borgaretto di Beinasco (IT)

(73) Assignee: Comau Spa, Grugliasco (IT)

( * ) Notice: Subject to any disclaimer, the term of this patent is extended or adjusted under 35 U.S.C. 154(b) by 43 days.

(21) Appl. No.: 10/880,429

(22) Filed: Jun. 29, 2004

(65) Prior Publication Data

US 2005/0023251 A1    Feb. 3, 2005

(30) Foreign Application Priority Data

Jul. 4, 2003   (IT)   .......................... TO2003A0517

(51) Int. Cl.
*B23K 11/10* (2006.01)
(52) U.S. Cl. .......................... 219/86.25; 219/89; 219/90
(58) Field of Classification Search .................. 219/89, 219/90, 86.61, 86.25
See application file for complete search history.

(56) References Cited

U.S. PATENT DOCUMENTS 4,525,618 A * 6/1985 Beneteau ..................... 219/89
5,099,099 A * 3/1992 Saito ........................... 219/89
5,198,633 A * 3/1993 Umeda ........................ 219/89
5,252,801 A * 10/1993 Angel et al. ............. 219/86.61
6,723,944 B1 * 4/2004 Angel .......................... 219/90

FOREIGN PATENT DOCUMENTS

DE          296 16 855 U1    12/1996
FR          2 822 746         10/2002

\* cited by examiner

*Primary Examiner*—Kevin P. Kerns
(74) *Attorney, Agent, or Firm*—Seed IP Law Group PLLC

(57) ABSTRACT

Spot welding gun, having a support, a lower half-gun and an upper half-gun articulated one to the other by a pin, mounted in an oscillating configuration with respect to said support and propping up corresponding welding arms, and a working cylinder including a body and a stem moving with respect to the body so as to control the movement of the upper half-gun and of the lower half-gun. The support has a main plate from which extend two parallel support sides with an articulation axis around which the lower half-gun and the upper half-gun are articulated. The lower half-gun comprises two actuating forks to which the body of the working cylinder is articulated around an axis parallel to the articulation axis. The stem of the working cylinder has an end articulated to the upper half-gun around another axis parallel to said articulation axis.

9 Claims, 5 Drawing Sheets

WELDING GUN

TECHNICAL FIELD

The present invention relates to resistance spot welding of metal sheet elements, and namely to resistance spot welding with guns handled by industrial robots.

BACKGROUND OF THE INVENTION

A spot welding gun is a device that applies forces around 400 daN (1daN=10N) to sheet parts placed between the electrodes. A significant number of robotized welding applications make use of guns whose effective arm length is on average of 400 mm. Supplied currents are of 10–17 kA and require sections for laminated cores, gun arms and electrodes of 600–800 mm².

In order to meet said designing needs, known welding guns are quite heavy. The average weight of known welding guns with an effective length of 400 mm, force supplied during welding of 400 daN and welding current of 16,000 A or above, is around 80–85 kg.

In the case of welding guns designed to be mounted onto the arm of an industrial robot, gun weight is a crucial point. The gun should be designed depending on robot strain chart defining the maximum weight to be applied onto the wrist according to the center of gravity of the welding gun, so as to ensure the possibility of handling the gun with high accelerations.

Reducing gun weight permits using robots whose strain chart is smaller of one or two sizes than currently used robots. Such size reduction results in significant cost reductions when purchasing a robot.

BRIEF SUMMARY OF THE INVENTION

The present invention aims at providing a welding gun that is lighter than known welding guns, though with the same operating features.

According to the present invention, said aim is achieved by a gun having the characteristics disclosed in the claims.

BRIEF DESCRIPTION OF THE DRAWINGS

The present invention shall now be described in detail with reference to the accompanying drawings, given by mere way of non-limiting example, where.

DETAILED DESCRIPTION OF THE INVENTION

Figure 1:
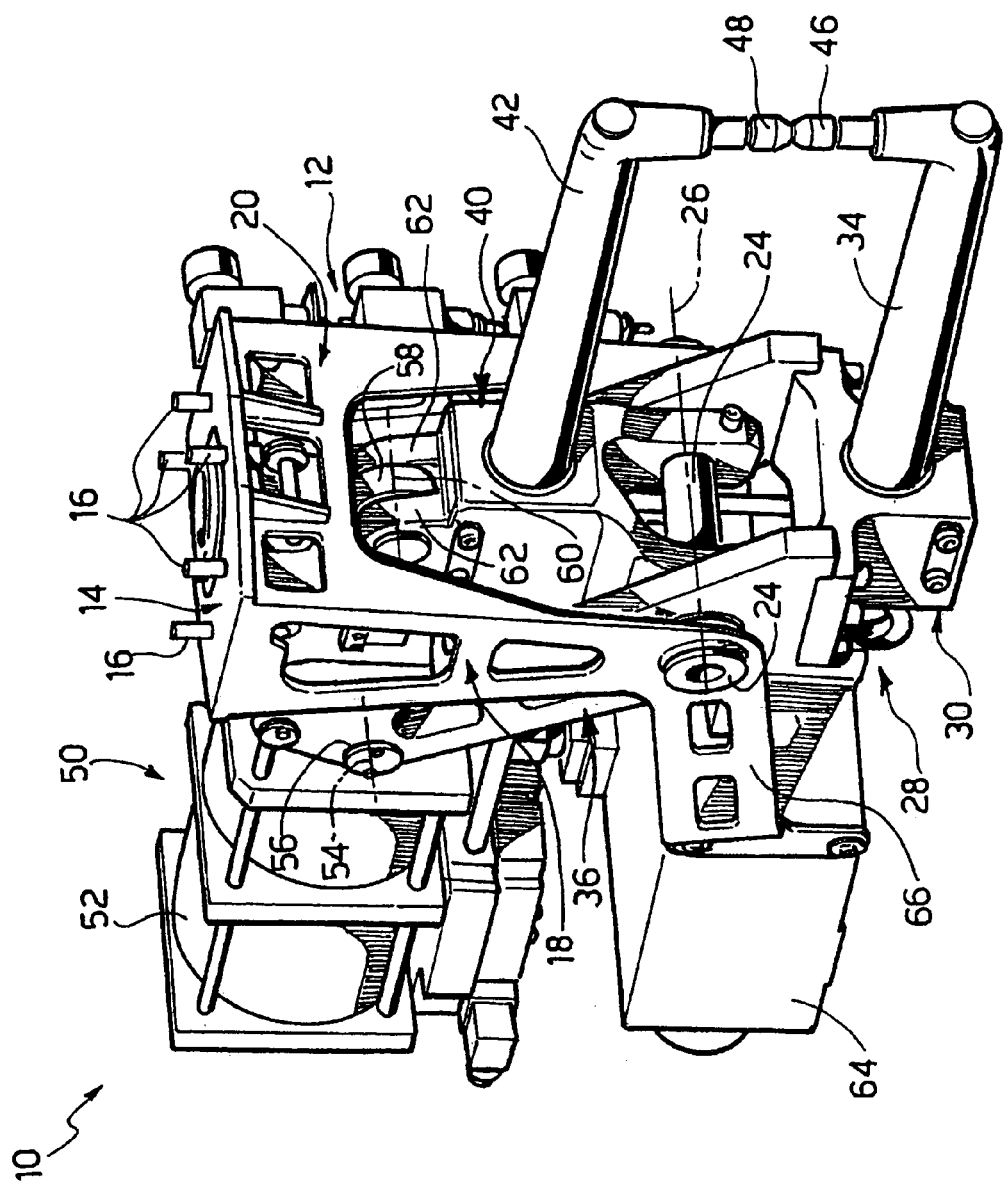
FIG. 1 is a perspective view of a first embodiment of a welding gun according to the present invention.
Figure 2:
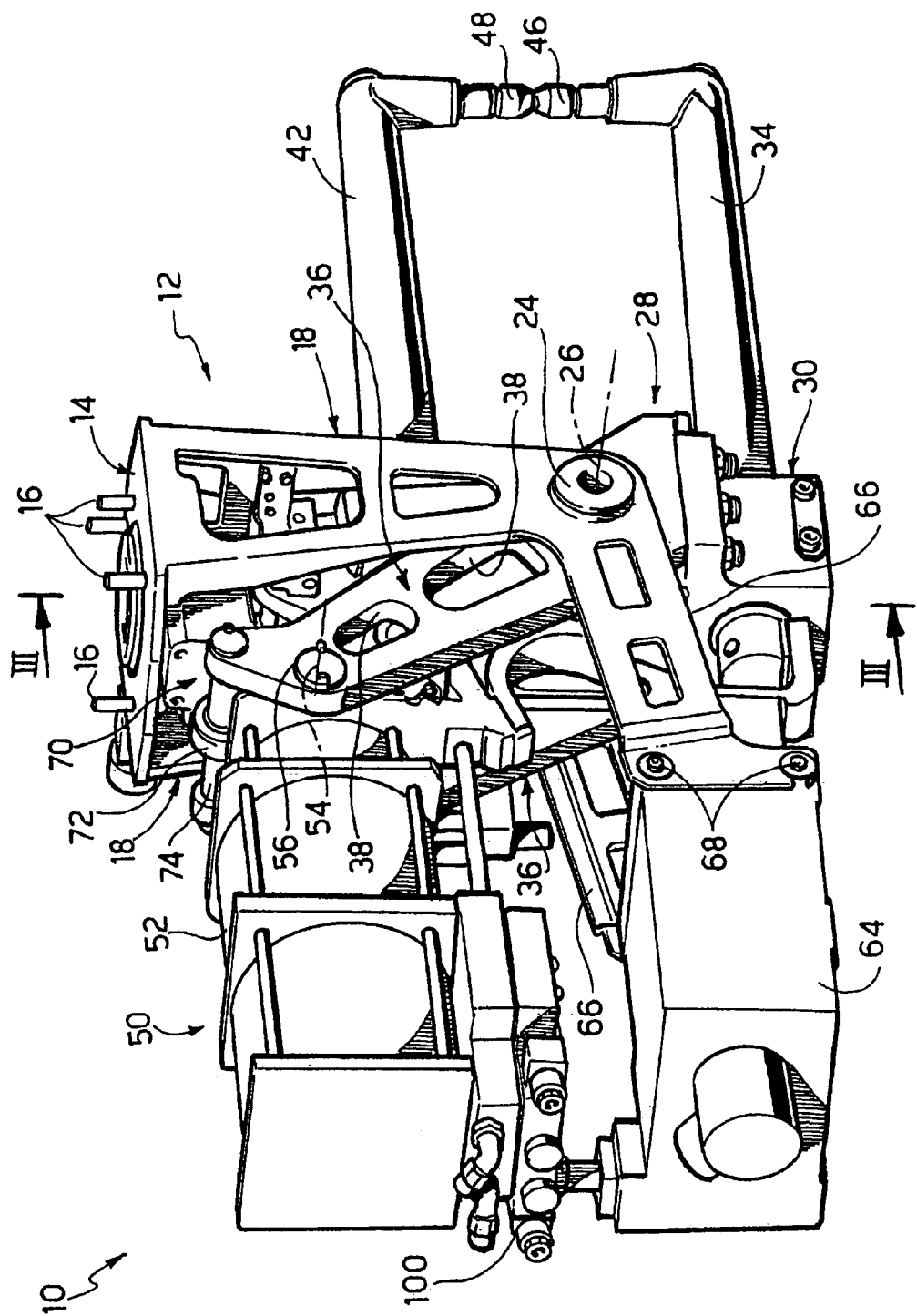
FIG. 2 is a perspective view from a different angle of the welding gun of FIG. 1.
Figure 3:
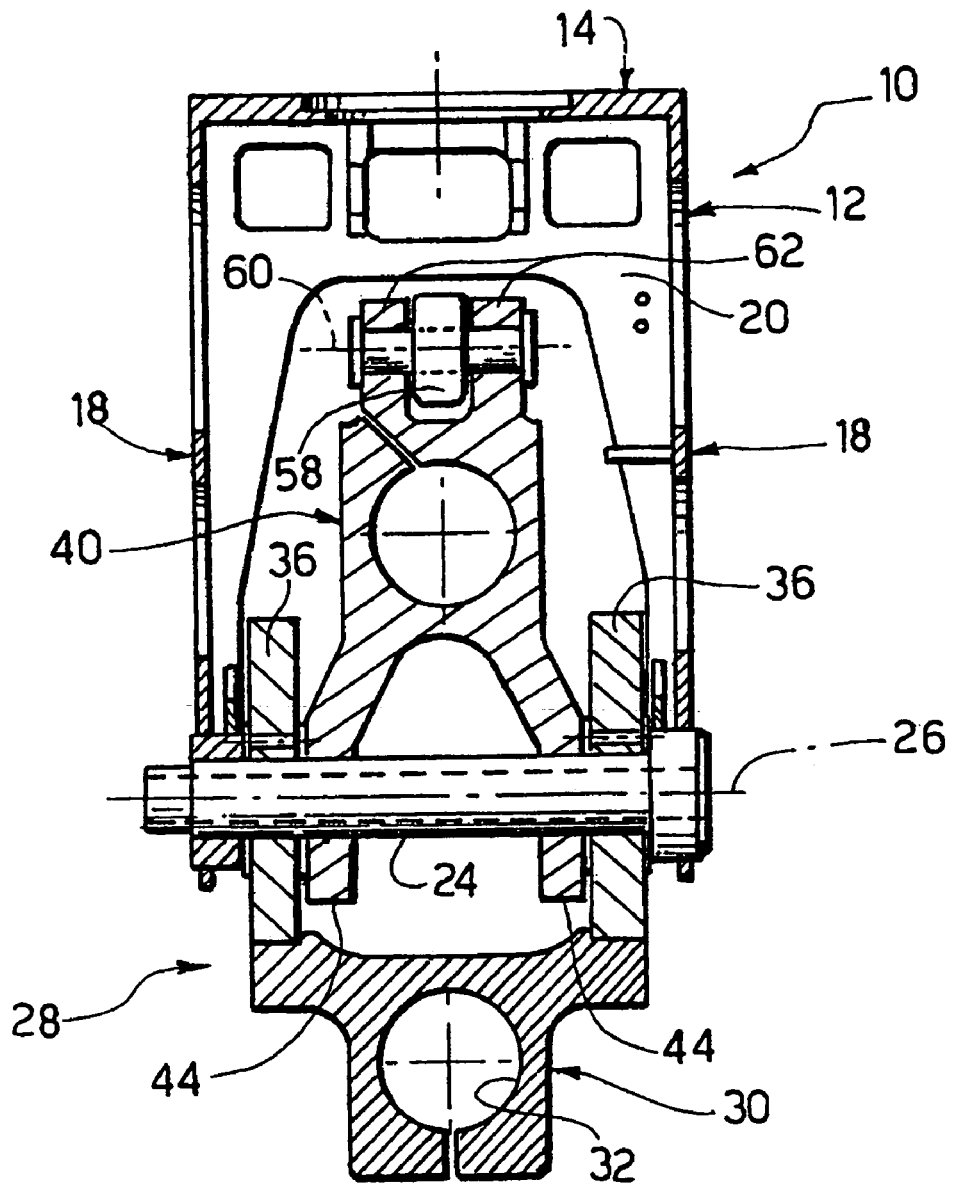
FIG. 3 is a section according to line III—III of FIG. 2.

With reference to FIGS. 1 to 3, number 10 refers to a spot welding gun designed to be mounted onto an industrial robot (not shown). The gun 10 comprises a support 12, which can be made of steel welded sheet. In order to further reduce weight, said support 12 can also be made of aluminum alloy, Ergal, which is known as a kind of aluminum alloy, for example. Preferably, the support 12 consists of a main plate 14, two sides 18 provided with relief openings, and a front stiffening plate 20. If the support is made of aluminum alloy, the plate 14, the sides 18 and the stiffening plate 20 are preferably fastened to each other by means of screws (not shown).

The main plate 14 is equipped with fastening means 16 for fastening the gun 10 to a robot wrist. The support sides 18 are parallel to each other and protrude from the main plate 14.

As is shown in further detail in FIG. 3, the two support sides 18 are provided with coaxial holes through which extends an articulating pin 24. The articulating pin 24 can freely rotate with respect to the sides 18 around its own axis 26, which extends in an orthogonal direction with respect to the sides 18.

The welding gun 10 comprises:
1. a lower half-gun 28 equipped with two actuating forks 36;
2. an upper half-gun 40;
3. a lower arm 34 mounted onto the lower half-gun 30;
4. an upper arm 42 mounted onto the upper half-gun 40;
5. a transformer 64;
6. a working cylinder 50;
7. a balancing cylinder 70.

The components described above are the main and essential components of the gun. The two half-guns, made of aluminum alloy, Ergal for instance, are articulated on the articulating pin 24. The gun arms, made of copper alloy, CuCrZr for instance, are electrically insulated from the gun bodies with a bushing.

The lower half-gun 28 is articulated to the support sides 18 around axis 26. Said lower half-gun 28 comprises a basically block-shaped body 30 having a hole 32 into which is inserted and blocked an end portion of a lower welding arm 34.

Two actuating forks 36 are connected to the lower half-gun. Said lateral forks 36 connect the body of the working cylinder 50–52 to the lower half-gun. The actuating forks 36 and the lower half-gun are preferably made of aluminum alloy, Ergal for instance. The actuating forks 36 are two plate-shaped elements parallel to each other, which extend according to corresponding parallel planes located inside with respect to the planes on which extend the support sides 18. The actuating forks 36 are preferably provided with relief openings 38.

Gun articulation is implemented by the articulating pin 24, which blocks the lower half-gun (through the two lateral forks 36) and the upper half-gun through the two forks 44. The pin 24 mounted onto the gun support props up and articulates gun moving portion with respect to gun support.

The distance between welding electrodes 46, 48 and articulation axis 26 is the effective gun length, which in a practical embodiment of the present invention can be for instance of 400 mm.

The gun 10 comprises a compressed air working cylinder 50 for controlling the opening and closing movement of the half-guns 28, 40. The working cylinder 50 has a body 52 connected to the actuating forks 36 with an articulation around an axis 54 parallel to the articulation axis 26. The articulation axis 54 between the body 52 and the actuating forks 36 consists of a pair of pins 56. The body 52 of the cylinder 50 is arranged between the planes containing the plate-shaped elements of the actuating forks 36. The cylinder 50 has a stem moving in rectilinear direction, whose end 58 is articulated to the upper half-gun 40 around an axis 60 parallel to the articulation axis 26. As is shown in FIG. 3, the stem end of the cylinder 58 of the actuator 50 is articulated between two extensions 62 of the upper half-gun 40. The body 52 of the pneumatic actuator 50 protrudes from the actuating forks 36 on the opposite side with respect to the welding arms 34, 42 and extends in an orthogonal direction with respect to axis 26.

The gun 10 further comprises an electric transformer 64, which can be medium frequency (1000 Hz; I2p=6300 A) or alternatively low frequency (50 Hz; I2p=5000 A), electrically connected to the arms 34, 42 and supported by the extending portions 66 of the support 12. With reference to FIGS. 1 and 2, the sides 18 of the support 12 have a general L shape, with extending portions 66 extending beyond the articulating pin 24, which is placed in the connection area between the two branches of the L-shaped sides. The transformer is fastened to the two extending portions 66 through screws 68. The transformer 64 protrudes from the extending portions 66 on the opposite side with respect to the arms 34, 42.

The gun 10 further comprises a balancing cylinder referred to with number 70 in FIG. 2. The balancing cylinder 70 has a body articulated to the support 12 and a stem with an end 72 articulated to a pin 74. The pin 74, beyond articulating the balancing cylinder, keeps the two actuating forks 36 parallel to each other and at a reciprocal fixed distance during supply of the welding force by the working cylinder. The aim of the balancing cylinder is to keep the gun moving portion against the gun support in a well defined position when the gun, either open or totally open, is handled by the robot.

The force exerted by the balancing cylinder 70 compensates the torque of the weight force applied to the center of gravity of the gun moving portion when the gun is in vertical position and in a position rotated of 90° with respect to the vertical line.

The gun moving portion basically consists of all the parts described above, except for the gun support, the transformer and the balancing cylinder.

The opening and closing movement of the gun is controlled by the working cylinder 50 by means of a set of electrovalves 100, which can be mounted onto the body 52 of the cylinder 50. When the cylinder stem extends, it generates a force that makes the half-guns 28, 40 rotate in a direction of reciprocal approaching of the arms 34, 42 by applying between the electrodes 46 and 48 the welding force fs=400 daN. This force acts upon the half-guns 28 and 40 only. The support 12 is not acted upon by the force generated by the cylinder 50 and can therefore be of a relatively light structure.

The gun according to the present invention consists of a small number of components and, with respect to known guns having the same effective length and the same tightening force, has an exceedingly lower weight of about 59 kg in its version with low frequency transformer.

The idea with which it has been engineered is the design of a gun made of seven essential main components only, giving to each of them several mechanical-pneumatic-electric functions, differently from currently marketed guns where there is a dedicated mechanical component for each mechanical-pneumatic-electric function.

Figure 4:
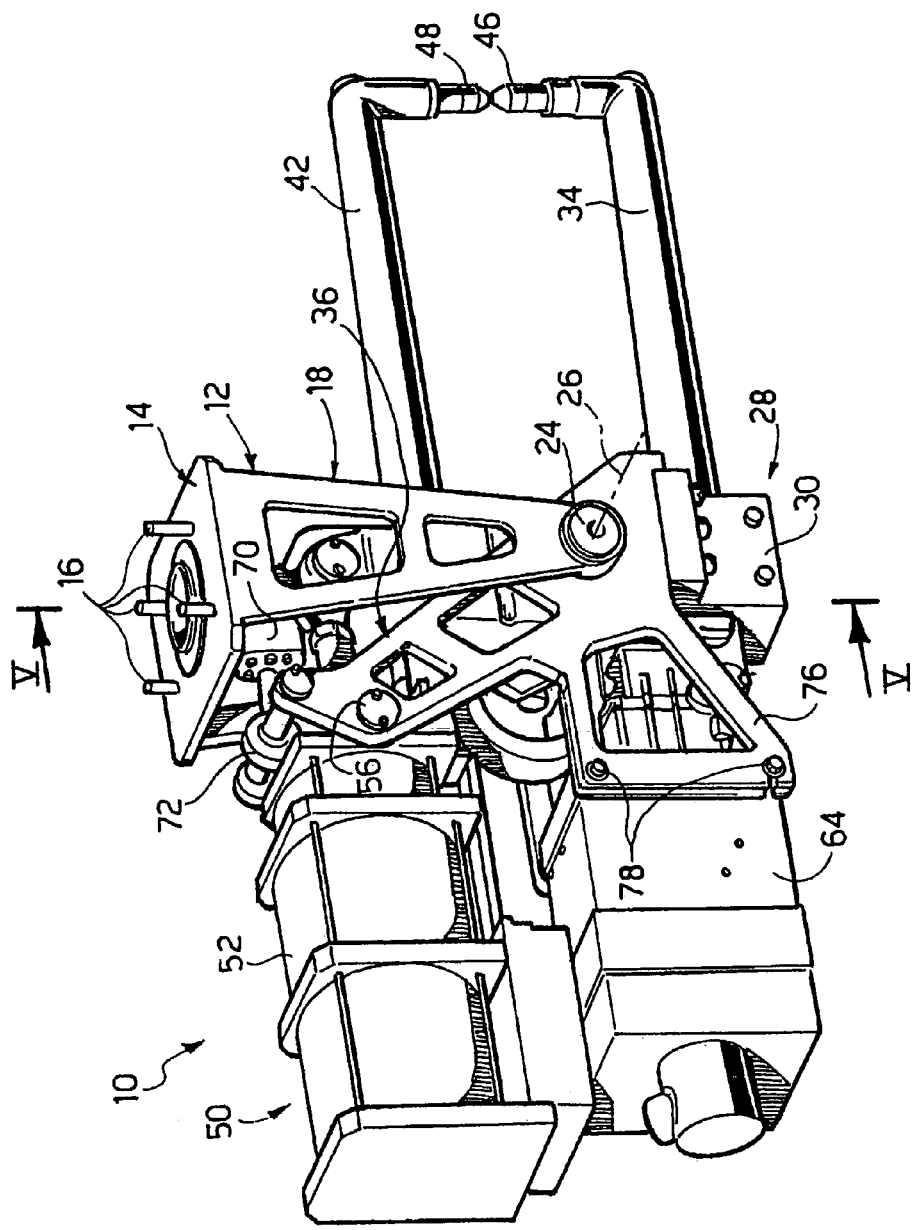
FIG. 4 is a perspective view of a second embodiment of a gun according to the present invention.
Figure 5:
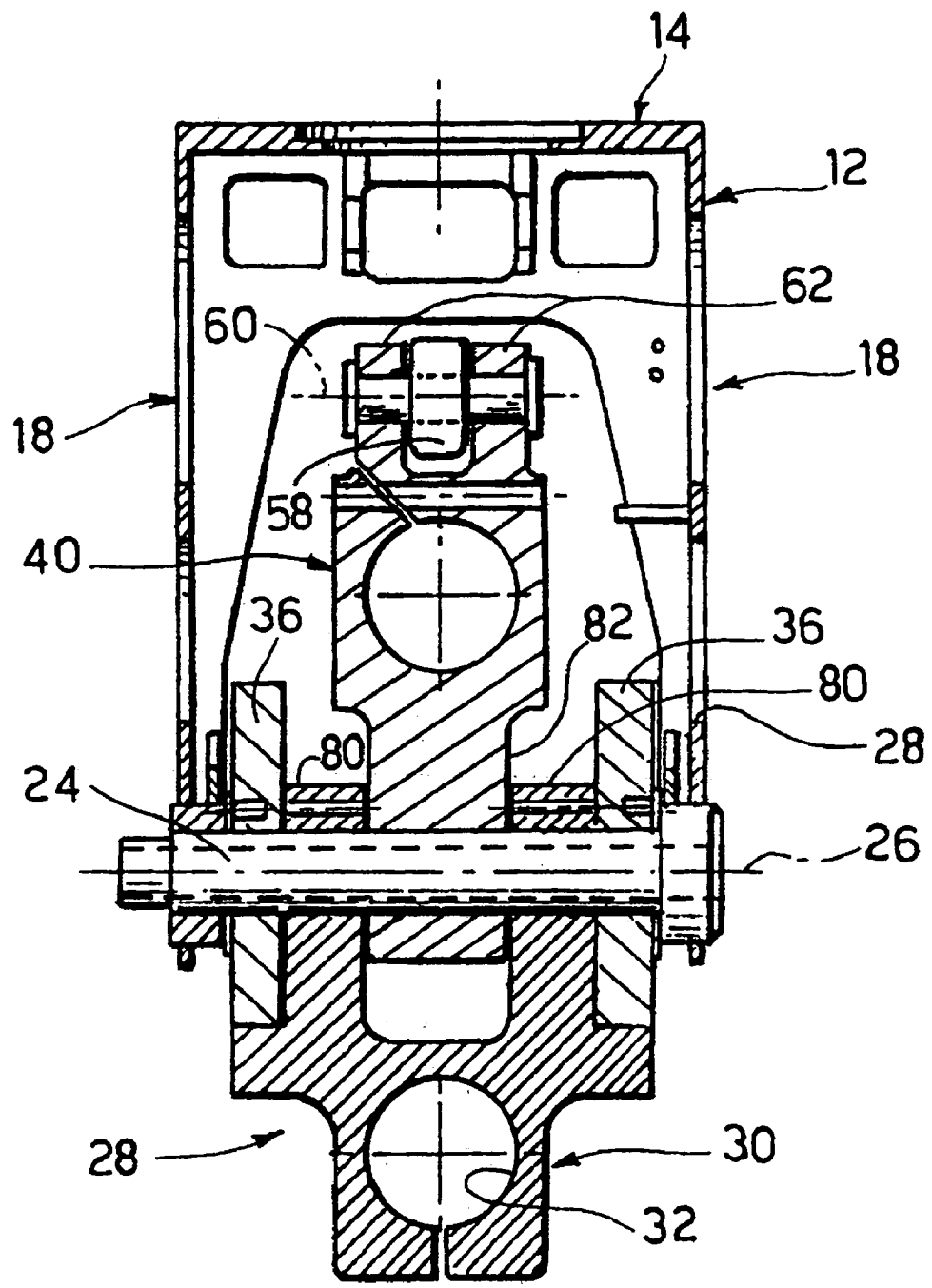
FIG. 5 is a section according to line V—V of FIG. 4.

The gun according to the invention can be subject to several variants, one of which is shown in FIGS. 4 and 5, in which the components corresponding to those described above are provided with the same reference numbers. In the variant shown in FIGS. 4 and 5, the sides 18 of the support 12 are not equipped with the extensions 66. The actuating forks 36 are provided with extending portions 76 to which the transformer 64 is fastened through screws 78. Thus, in this case the transformer 64 is integral with the lower half-gun 28 and oscillates together with the latter during gun opening and closing movements.

With reference to FIG. 5, in this second embodiment of the gun according to the invention, the body 30 of the lower half-gun 28 has a fork 80 with aligned holes engaging the pin 24 in a rotating configuration.

The upper half-gun 40 has only one protruding portion 82 provided with a hole, said portion being fastened onto the pin 24. The protruding portion 82 of the upper half-gun 40 is arranged within the fork 80 of the lower half-gun 28. Each of the two plate-shaped elements of the actuating forks 36 is arranged between a support side 18 and the fork 80 of the lower half-gun 28.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. Spot welding gun, comprising:
a support,
a lower half-gun and an upper half-gun articulated one to the other by a pin, mounted in an oscillating configuration with respect to said support and propping up corresponding welding arms,
a working cylinder including a body and a stem moving with respect to the body so as to control a reciprocal movement between the upper half-gun and the lower half-gun, and
a balancing cylinder having a body articulated to the support and a stem articulated to a pin extending on the extensions of the actuating forks;
the support has a main plate from which extends two parallel support sides with a first articulation axis around which the lower half-gun and the upper half-gun are articulated,
the lower half-gun comprises two actuating forks to which the body of said working cylinder is articulated around a second articulation axis parallel to the first articulation axis,
the stem of the working cylinder has an end articulated to the upper half-gun around a third articulation axis parallel to said first articulation axis; and
the actuating forks have extensions extending above the second articulation axis.

2. Gun according to claim 1 wherein said actuating forks extend inside with respect to the support sides.

3. Gun according to claim 1 wherein said actuating forks are provided with aligned holes engaged in a rotating configuration by an articulating pin.

4. Gun according to claim 3 wherein said lower half-gun comprises a body mounted in a rotating configuration around said articulating pin.

5. Gun according to claim 1 wherein said working cylinder protrudes from said actuating forks on an opposite side with respect to said welding arms.

6. Gun according to claim 1 comprising an electric transformer protruding on an opposite side with respect to said welding arms.

7. Gun according to claim 6 wherein said electric transformer is fastened to extending portions of said support sides.

8. Gun according to claim 6 wherein said electric transformer is fastened to extending portions of said actuating forks.

9. Spot welding gun, comprising:

a support, having a main plate from which extends two parallel support sides with a first articulation axis around which the lower half-gun and the upper half-gun are articulated, a lower half-gun and an upper half-gun articulated one to the other by a pin, mounted in an oscillating configuration with respect to said support and propping up corresponding welding arms, the lower half-gun having two actuating forks to which the body of said working cylinder is articulated around a second articulation axis parallel to the first articulation axis, a working cylinder including a body and a stem moving with respect to the body so as to control a reciprocal movement between the upper half-gun and the lower half-gun, and an electric transformer protruding on an opposite side with respect to said welding arms, the stem of the working cylinder has an end articulated to the upper half-gun around a third articulation axis parallel to said first articulation axis, and the electric transformer is fastened to extending portions of the actuating forks.

* * * * *